United States Patent [19]
Kaku et al.

[11] Patent Number: 5,650,953
[45] Date of Patent: Jul. 22, 1997

[54] RECIPROCAL NUMBER ARITHMETIC OPERATING METHOD AND CIRCUIT WHICH ARE USED IN MODEM

[75] Inventors: Takashi Kaku; Hideo Miyazawa, both of Kawasaki, Japan

[73] Assignee: Fujitsu Limited, Kawasaki, Japan

[21] Appl. No.: 468,186

[22] Filed: Jun. 6, 1995

Related U.S. Application Data

[63] Continuation of Ser. No. 166,821, Dec. 15, 1993, abandoned.

[30] Foreign Application Priority Data

Dec. 25, 1992 [JP] Japan ................................. 4-345731

[51] Int. Cl.⁶ ...................................................... G06F 7/552
[52] U.S. Cl. ................................................ 364/752; 364/735
[58] Field of Search ................................ 364/752, 715.01, 364/735, 761, 814

[56] References Cited

U.S. PATENT DOCUMENTS

| | | | |
|---|---|---|---|
| 4,599,701 | 7/1986 | Vojir et al. ................................ | 364/752 |
| 4,694,417 | 9/1987 | Cantwell ................................... | 364/752 |
| 4,736,334 | 4/1988 | Mehrgardt ................................ | 364/752 |
| 4,747,067 | 5/1988 | Jayodnik, Jr. et al. .................. | 364/752 |

OTHER PUBLICATIONS

"Automatic Computation of Exponentials, Logarithms, Ratios and Square Roots," Tien Chi Chen, IBM Journal of Research and Development, vol. 16, No. 4, Jul. 1972, New York, pp. 380–388.

"A Floating–Point VLSI Chip for the TRON Architecture," S. Kawasaki et al., IEEE Micro, vol. 9, No. 3, Jun. 1989, New York, pp. 26–44.

"Fractional–Arithmetik," R. Wollenberg et al., Elektronik, vol. 34, No. 22, Oct. 1985, Munchen, pp. 78–82.

"Some Properties of Iterative Square–Rooting Methods Using High Speed Multiplication," C. Ramamoorthy et al., IEEE Transactions on Computers, vol. C–21, No. 8, Aug. 1972, New York, pp. 837–847.

"Efficient Method to Compute Reciprocal and Riciprocal Square Root in RISC Processors," IBM Technical Disclosure Bulletin, vol. 36, No. 7, Jul. 1993, New York, pp. 517–518.

*Primary Examiner*—David H. Malzahn
*Attorney, Agent, or Firm*—Staas & Halsey

[57] ABSTRACT

The level of the input vector signal $(X+jY)$ is reduced to $(X+jY)/\sqrt{2}$ in the overflow preventing circuit. A power arithmetic operating circuit squares the level-down input vector signal, to obtain a power value $(X^2+Y^2)/2$. The initial value of the tap value (K) which is finally set to a reciprocal number value is multiplied two times by a multiplying circuit, thereby obtaining $K^2(X+Y)^2/2$. Further, a differential circuit obtains an error signal $(\Delta K)=1/2-K^2(X^2+Y^2)/2$ with a reference. An updating circuit updates the tap value (K) so that the error signal ($\Delta K$) is equal to 0. A loop arithmetic operation of the multiplication of the tap value, differential arithmetic operation, and updating of the tap value is repeated until the error signal ($\Delta K$) is converged to a predetermined value or less. The tap value (K) when it was converged is obtained as a reciprocal number value $1/\sqrt{(X^2+Y^2)}$ of the amplitude of the input vector signal.

9 Claims, 6 Drawing Sheets

RECIPROCAL NUMBER ARITHMETIC OPERATING METHOD AND CIRCUIT WHICH ARE USED IN MODEM

This application is a continuation of application Ser. No. 08/166,821, filed Dec. 15, 1993, now abandoned.

BACKGROUND OF THE INVENTION

The present invention relates to reciprocal number arithmetic operating method and circuit which are used in an amplitude normalizing circuit of a modem or the like and, more particularly, to reciprocal number arithmetic operating method and circuit for calculating a reciprocal number of an amplitude of an input vector signal.

In recent years, miniaturization of size and reduction of a price of a modem have been advanced in association with popularization of data communication using a telephone line. Therefore, the miniaturization and simplification of the circuit in the modem are necessary.

Figure 1:
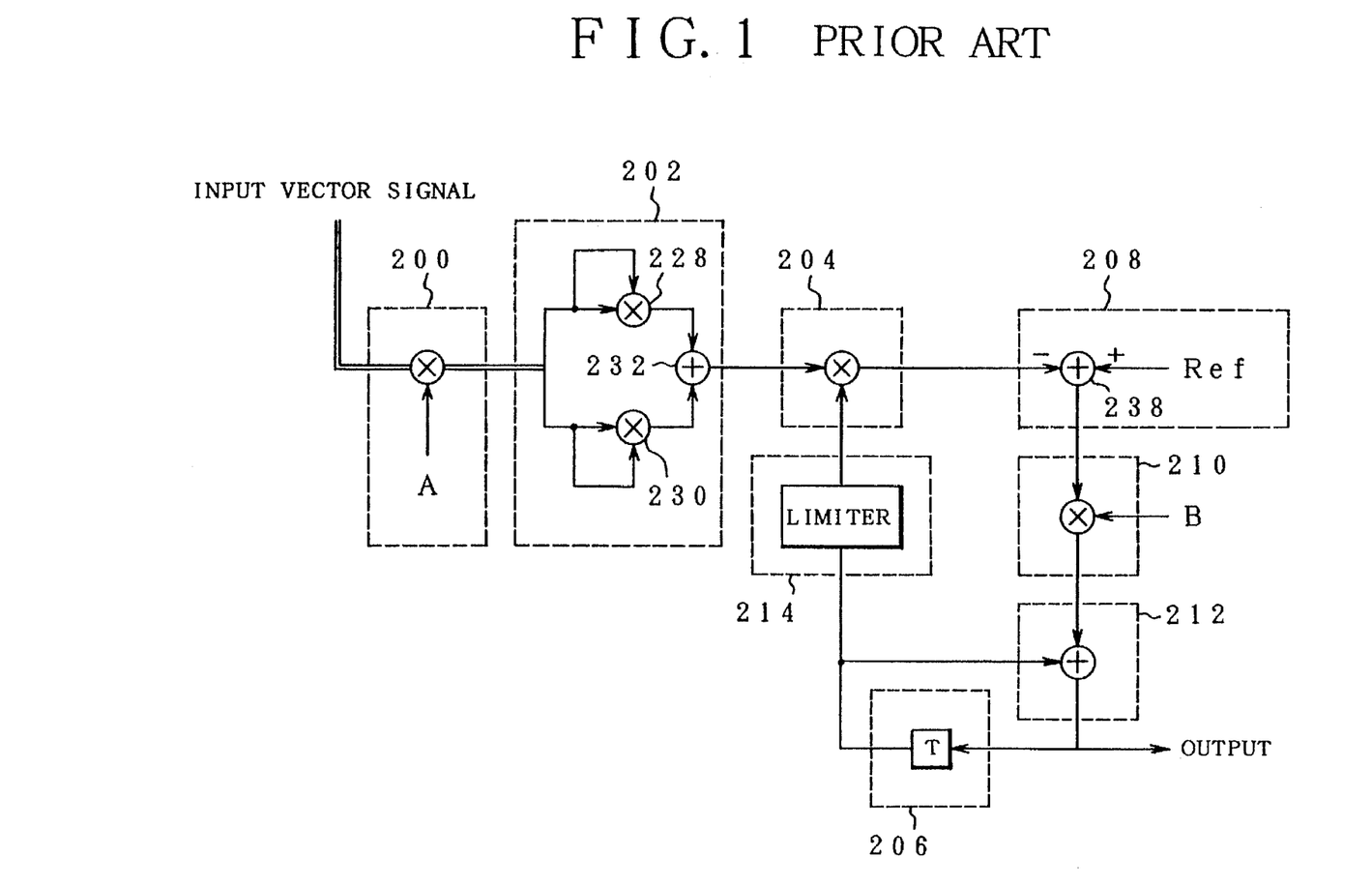
FIG. 1 is a block diagram of a conventional circuit.

FIG. 1 shows a conventional reciprocal number arithmetic operating circuit which is used in a modem. The conventional reciprocal number arithmetic operating circuit comprises: an overflow preventing circuit 200, a power operating circuit 202; a multiplying circuit 204, a tap value generating circuit 206, a differential circuit 208, a limiter circuit 214, a loop gain adjusting circuit 210, and an updating circuit 212.

The operation of the conventional reciprocal number arithmetic operating circuit will now be described. First, to prevent a signal overflow by an arithmetic operation, by multiplying a constant (A) to an input vector signal (X+jY), an input signal (X+jY)·A whose level was reduced is obtained in the overflow preventing circuit 200. Subsequently, the square of a real component and an imaginary component is obtained by each of multiplying circuits 228 and 230 in the power operating circuit 202, and those squares are added by an adder 232, thereby obtaining a power value $(X^2+Y^2) \cdot A^2$.

On the other hand, a predetermined initial value has been set as a tap value (K) into the tap value generating circuit 206. The result which is obtained by updating the tap value (K) indicates a reciprocal number of an amplitude value of an input vector signal which is finally obtained. An output signal from the power operating circuit 202 is multiplied by the tap value (K) obtained through the limiter circuit 214 by the multiplying circuit 204 and the resultant value is supplied to the differential circuit 208. A predetermined reference (Ref) has been preset into the differential circuit 208. An error signal (ΔK) is obtained as follows by an adder 238.

$$\Delta K = Ref - K \cdot (X^2+Y^2) \cdot A^2$$

The error signal (ΔK) obtained by the differential circuit 208 is multiplied with a constant (B) for setting a loop gain to 1.0 or less by the loop gain adjusting circuit 210. After that, the resultant value is supplied to the updating circuit 212 and is added to the tap value (K), thereby updating as follows:

$$K = K + \Delta K$$

In this instance, in order to set the value (ΔK) which is obtained by the differential circuit 208 to 0, a loop process in which processes by the multiplying circuit 204, differential circuit 208, loop gain adjusting circuit 210, and updating circuit 212 are repeated several times is executed. The tap value (K) which is obtained when the error signal is converged to a presumed value is generated as a reciprocal number value of the amplitude of the input vector signal (X+jY).

On the other hand, the reciprocal number value of the amplitude of the input vector signal (X+jY) which is obtained by the reciprocal number arithmetic operating circuit should be inherently equal to $1/\sqrt{(X^2+Y^2)}$. However, in the conventional reciprocal number arithmetic operating circuit shown in FIG. 1, since the tap value (K) of the reciprocal number value to be obtained is multiplied only once, the reciprocal number value is equal to $1/(X^2+Y^2)$. Therefore, when the user tries to obtain the accurate reciprocal number value, the processing time and arithmetic operation amount increase.

Figure 4:
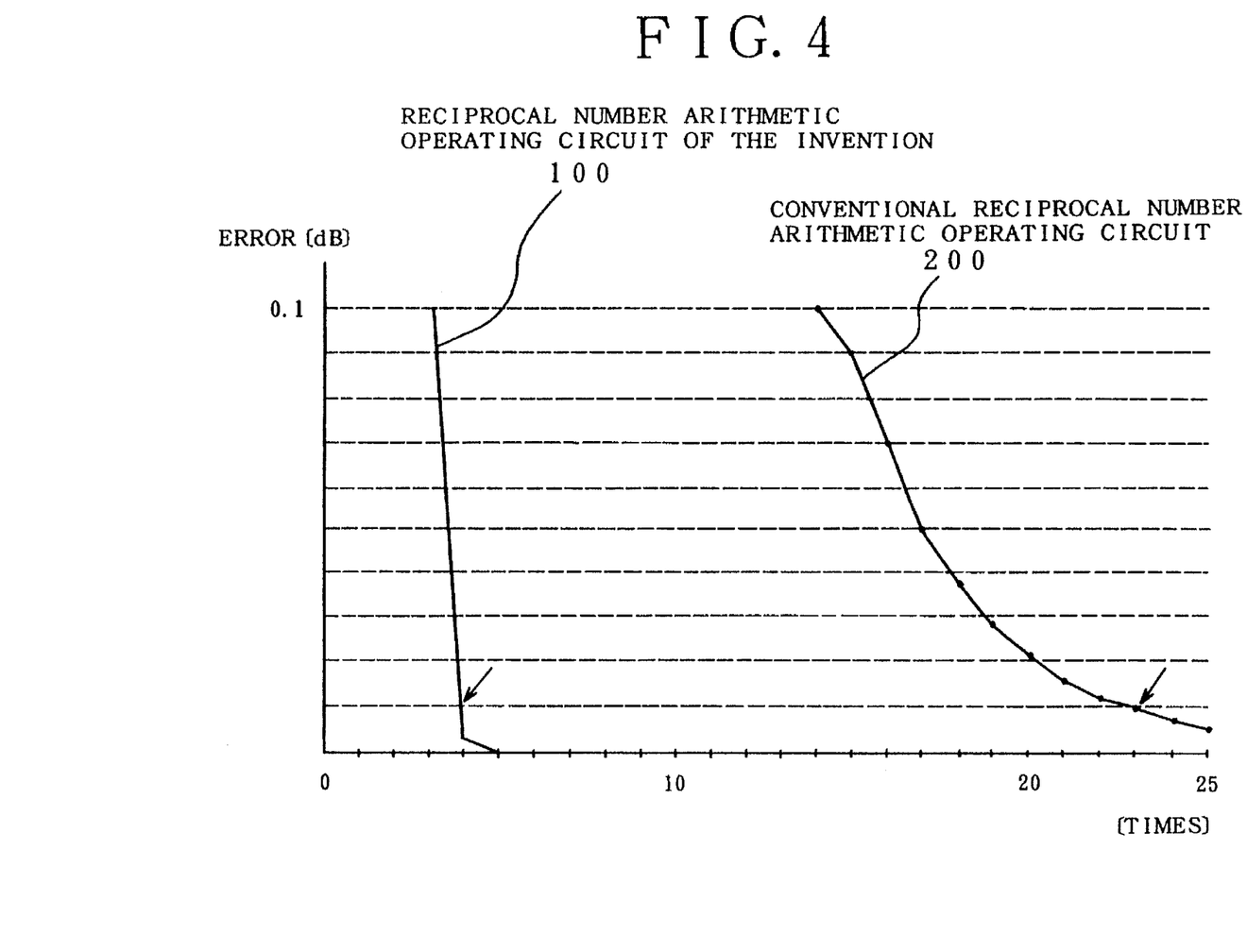
FIG. 4 is an explanatory diagram showing the number of loop processes until an error is converged to a specific error by comparing the circuit according to the invention and the conventional circuit.

A graph 200 in FIG. 4 shows the number of loop times until the error is converged to a specified error in the conventional reciprocal number arithmetic operating circuit. In order to set the error signal (ΔK) of the obtained reciprocal number value to, for example, 0.01 dB or less, the loop process by the multiplying circuit 204, differential circuit 208, loop gain adjusting circuit 210, and updating circuit 212 must be repeated 24 times, so that both the converging time and the operation amount increase.

SUMMARY OF THE INVENTION

According to the invention, reciprocal number arithmetic operating method and circuit in which a reciprocal number value of an amplitude of an input vector signal can be obtained by a small operation amount and in a short time are provided.

The present invention arithmetically operates a reciprocal number value of an amplitude of an input vector signal (X+jY) having a real component (X) and an imaginary component (Y). First, in order to prevent a signal overflow by the arithmetic operation, a constant (A) for a level down is multiplied to the input vector signal (X+jY). As a constant (A), for example, $1/\sqrt{2}$ is used. Subsequently, the square of the real component and the square of the imaginary component of the input vector signal whose level was reduced are arithmetically operated and are added, thereby obtaining a power value $(X^2+Y^2)$.

On the other hand, the tap value (K) as a reciprocal number value is generated. As an initial value of the tap value (K), for example, 0.7559 is set. The tap value (K) is multiplied twice to the power value $(X^2+Y^2)$ which is obtained by the power arithmetic operation. Subsequently, a multiplication signal $K^2 (X^2+Y^2)$ is subtracted from a predetermined reference (Ref), thereby obtaining the error signal (ΔK). As a value of the reference (Ref), for example, 1/2 is used. In order to set the loop gain to be constant, the tap value (K) is multiplied by the error signal (ΔK), thereby adjusting the loop gain. The error signal in which the loop gain was adjusted is added to the tap value (K) generated in the tap step, thereby updating the error signal (ΔK) be 0.

In the case where the error signal (ΔK) is equal to or less than the predetermined value by repeating the loop arithmetic operations such as multiplication of ($K^2$), calculation of the difference (ΔK), loop gain adjustment, and updating of the tap value (K) as mentioned above, the tap value (K) at that time is generated as a reciprocal number value.

In order to set the loop gain to be constant, it is also possible to adjust the loop gain by multiplying the square ($K^2$) of the tap value (K) to the error signal (ΔK).

As a result, the reciprocal number value for the input vector signal can be obtained at a high precision by a small operation amount and in a short time. Further, since the circuit itself can be simplified more than the conventional circuit, the miniaturization and low costs of the apparatus can be also realized.

The above and other objects, features, and advantages of the present invention will become more apparent from the following detailed description with reference to the drawings.

DETAILED DESCRIPTION OF THE PREFERRED EMBODIMENT

Figure 2:
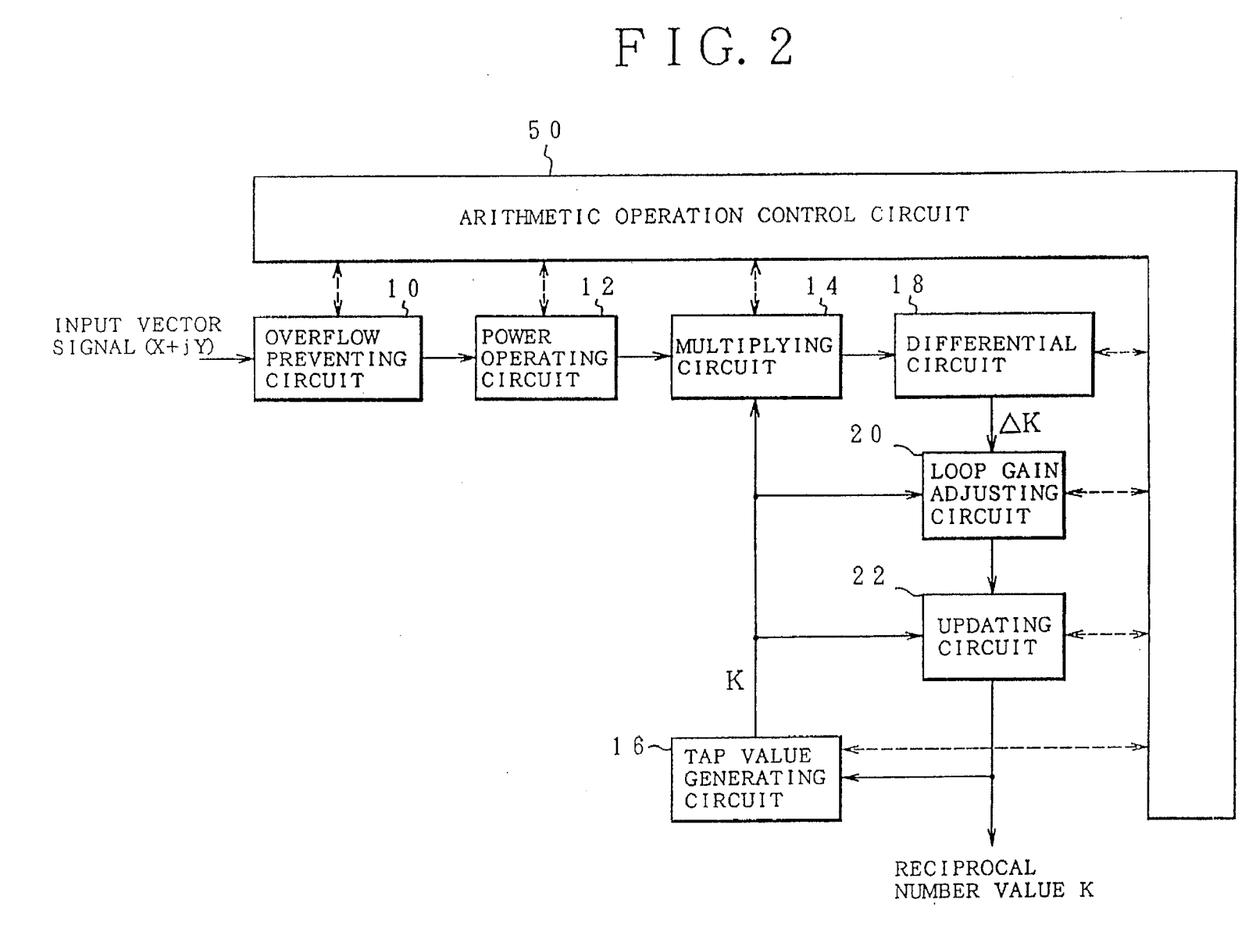
FIG. 2 is a block diagram showing a fundamental embodiment of the invention.

FIG. 2 shows a fundamental embodiment of the invention. A reciprocal number arithmetic operating circuit of the invention arithmetically operates a reciprocal number value $$1/\sqrt{(X^2+Y^2)}$$

of the amplitude of an input vector signal (X+jY). Therefore, the reciprocal number arithmetic operating circuit the present invention comprises an overflow preventing circuit 10, a power operating circuit 12, a multiplying circuit 14, a tap value generating circuit 16, a differential circuit 18, a loop gain adjusting circuit 20; and an updating circuit 22. A whole arithmetic operating procedure of an arithmetic operation control circuit 50 and the setting of an initial value are executed.

The overflow preventing circuit 10 multiplies a constant (A) to reduce the level of the input vector signal (X+jY) in order to prevent an overflow of the signal due to the arithmetic operation. As a value of the constant (A), $1/\sqrt{2}$ is used. The power arithmetic operating circuit 12 arithmetically operates on the square of a real component and the square of an imaginary component of an output signal of the overflow preventing circuit 10 and adds them, thereby obtaining a power $(X^2+Y^2)\cdot A^2$. The tap value generating circuit 16 sets the tap value (K) as a reciprocal number value and an initial value of the tap value is set to 0.7559. The multiplying circuit 14 multiplies the tap value (K) from the tap value generating circuit 16 to an output signal from the power arithmetic operating circuit 12 twice, thereby obtaining $K^2\cdot(X^2+Y^2)\cdot A^2$.

As a value of the reference (Ref), 1/2 is used. The loop gain adjusting circuit 20 multiplies the tap value (K) from the tap circuit 16 to the error signal (ΔK) of the differential circuit 18 in order to set the loop gain to be constant.

Further, the updating circuit 22 adds the error signal (ΔK) obtained through the loop gain adjusting circuit 20 to the tap value (K) from the tap value generating circuit 16, thereby updating the error signal (ΔK) from the differential circuit 18 so as to be set to 0.

The principle of the reciprocal number arithmetic operating process in FIG. 2 will now be described. For instance, assuming that the input vector signal is set to (X+jY), since the constant (A) of the level down is $$A = 1/\sqrt{2}$$

Thus, the output signal of the overflow preventing circuit 10 is $$(X+jY)/\sqrt{2}$$

The result of the arithmetic operation of the power arithmetic operating circuit 12 is $$(X^2+Y^2)/2$$

Assuming that the tap value of the reciprocal number value to be obtained is set to K, the processing result of the multiplying circuit 14 is $$K^2 (X^2+Y^2)/2$$

Further, the error signal (ΔK) to be obtained by the differential circuit is $$\Delta K = 1/2 - K^2(X^2+Y^2)/2 \tag{1}$$

The error signal (ΔK) from the differential circuit 18 is supplied to the loop gain adjusting circuit 20. The loop gain adjusting circuit 20 multiplies the tap value (K) by the error signal (ΔK) and obtains an adjusted error signal (ΔK') and outputs to the next updating circuit 22. The updating circuit 22 adds the tap value (K) to the error signal (ΔK') whose loop gain was adjusted by the loop gain adjusting circuit 20 and updates the result of the addition as a new tap value (K) of the tap value generating circuit 16. The loop process by the multiplying circuit 14, differential circuit 18, loop gain adjusting circuit 20, and updating circuit 22 is repeated by only a predetermined number of times. The tap value (K) just after the completion of the execution of the loop process of a repetition number of times is set to an output of a reciprocal number value to be obtained.

That is, the loop process to make the error signal (ΔK) which is given by the equation (1) approach 0 as closely as possible is executed. In the case where ΔK=0 in the equation (1), the following equation is satisfied.

$$1/2 - K^2(X^2+Y^2)/2 = 0 \tag{2}$$

By solving the equation (2), $$K^2(X^2 + Y^2)/2 = \tfrac{1}{2} \tag{3}$$
$$K^2(X^2 + Y^2) = 1$$
$$K^2 = 1/(X^2 + Y^2)$$

$$K = 1/\sqrt{(X^2+Y^2)}$$

Therefore, in the reciprocal number arithmetic operating circuit of the invention, the reciprocal number value of the amplitude for the input vector signal can be accurately obtained.

Figure 3:
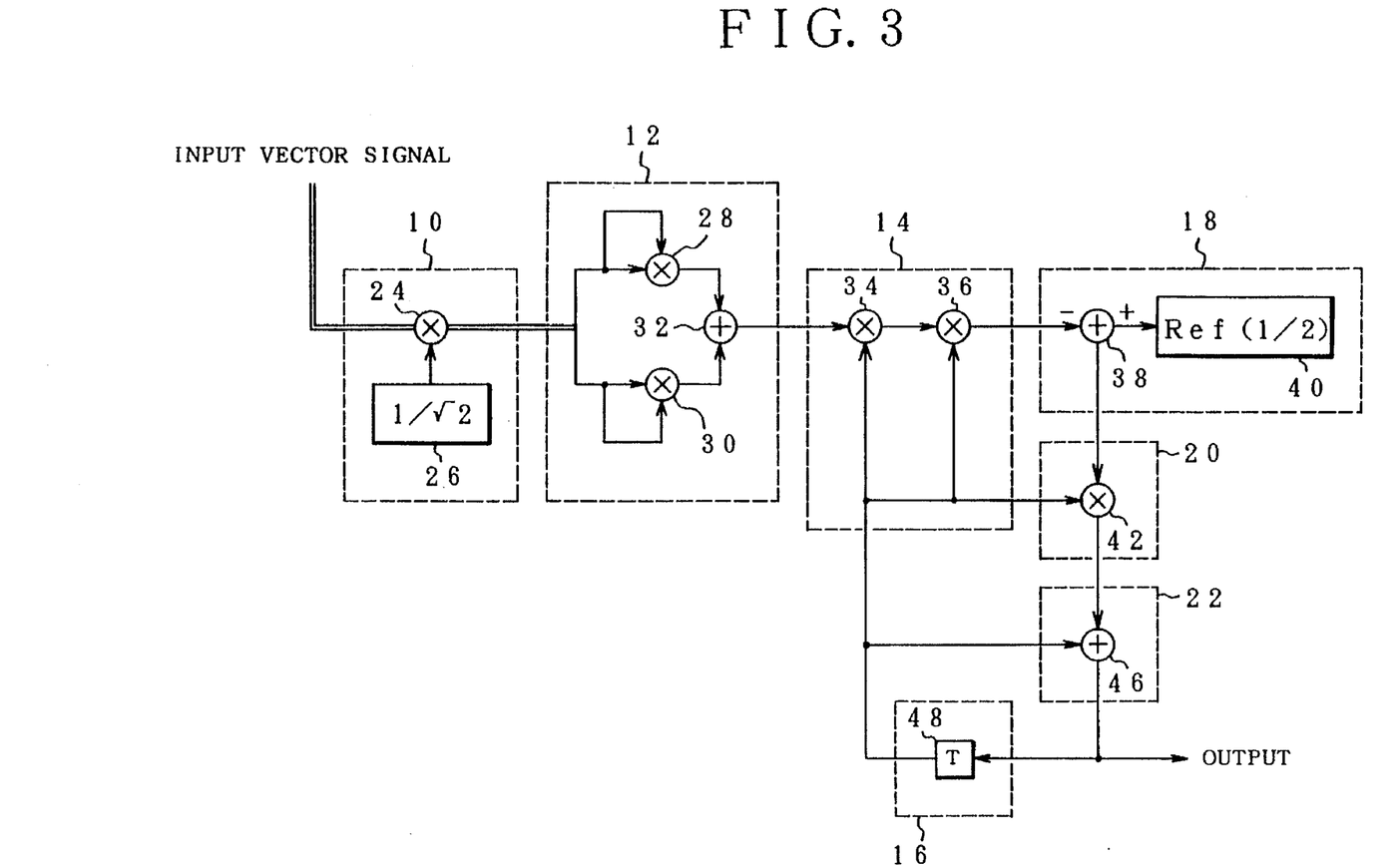
FIG. 3 is a circuit block diagram showing a specific embodiment of the invention which is realized by a digital signal processor.

FIG. 3 shows a specific embodiment of the invention and relates to the case where the circuit is realized by a digital signal processor having a vector arithmetic operating function.

In FIG. 3, a multiplier 24 and a constant setting device 26 are provided for the overflow preventing circuit 10. The multiplier 24 multiplies a constant (A) to reduce the level for preventing a signal overflow due to the arithmetic operation from the constant setting device 26 to the input vector signal (X+jY). As a constant (A), (A)=1/√2 is used in the invention.

In the power arithmetic operating circuit 12, the square of the real component and the square of the imaginary component of the input vector signal (X+jY)/√2 whose level was reduced by the overflow preventing circuit 10 are obtained and added. Due to this, multipliers 28 and 30 and an adder 32 are provided for the power arithmetic operating circuit 12. The multiplier 28 squares the real component of the input vector signal. The multiplier 30 squares the imaginary component of the input vector signal. The adder 32 adds the square of the real component from the multiplier 28 and the square of the imaginary component from the multiplier 30.

The multiplying circuit 14 multiplies the tap value (K) from the tap value generating circuit 16 by the output signal from the power arithmetic operating circuit 12 twice, thereby obtaining $$K^2(X^2+Y^2)/2$$

Namely, by using the multipliers 34 and 36, the tap value (K) is multiplied twice.

The differential circuit 18 has an adder 38 and a constant setting device 40 and subtracts the multiplication result of the multiplier 14 from the reference (Ref) set by the constant setting device 40, thereby obtaining the error signal ($\Delta K$). As a value of the reference (Ref) which is set by the constant setting device 40, 1/2 is used. Therefore, the differential circuit 18 generates $$\Delta K=1/2-K^2(X^2+Y^2)/2$$

as an error signal ($\Delta K$).

The reasons why the constant (A)=1/√2 is multiplied by the overflow circuit 10 and the reference (Ref)=1/2 is used in the differential circuit 18 will now be described. The maximum value of the input vector signal which is handled by the digital signal processor to realize the reciprocal number arithmetic operating circuit of the invention is equal to 2. It is necessary that the output from the power arithmetic operating circuit 12 to calculate the square is set to a value less than 2. Due to this, in the overflow preventing circuit 10, 1/√2 is multiplied to the input vector signal by the power arithmetic operating circuit 12 as a constant (A) which is set to 1/2 by being squared. The reference (Ref) which is used in the differential circuit 18 is set to (Ref)=1/2 in accordance with the constant (A)=1/√2 which is multiplied by the overflow preventing circuit 10.

In the loop gain adjusting circuit 20, the tap value (K) from a tap 48 provided for the tap value generating circuit 16 is multiplied to the error signal ($\Delta K$) from the differential circuit 18 by a multiplier 42, thereby holding the loop gain constant. Further, the updating circuit 22 has an adder 46 and adds the error signal ($\Delta K$) obtained through the loop gain adjusting circuit 20 to the tap value (K) generated at present by the tap value generating circuit 16, thereby updating the tap value (K).

In the embodiment of FIG. 3, in order to converge the error signal ($\Delta K$) which is generated from the differential circuit 18 to 0, the loop process by the multiplying circuit 14, differential circuit 18, loop gain adjusting circuit 20, and updating circuit 22 is repeated for one inputting operation of the input vector signal (X+jY).

As an initial value which is set into the tap 48 of the tap value generating circuit 16, a value in which the error ($\Delta K$) of the reciprocal number value that is obtained by the reciprocal number arithmetic operating circuit is most rapidly converged to 0.01 dB or less is experimentally obtained as follows.

I. A value of 0.5 to 2.0 is supplied as an input to the reciprocal number arithmetic operating circuit according to the invention on a unit basis of 0.01 and an error between the output result (obtained reciprocal number value) just after the circuit was looped five times and the ideal reciprocal number value obtained from the input value in this instance by the calculation is obtained with respect to all of the inputs.

II. The maximum error among the errors obtained in the above item I is derived.

III. The processes of the above items I and II are executed with respect to a range of the initial value of the tap of 0.5 to 2.0 on a unit basis of 0.01.

IV. The initial value of the tap as a minimum error among the maximum errors obtained in the item III is obtained.

By such experimental processes, the initial value which is set into the tap 48 of the tap value generating circuit 16 was equal to 0.7559. By setting the initial value (0.7559) into the tap 48, when the loop process by the multiplier 14, differential circuit 18, loop gain adjusting circuit 20, and updating circuit 22 is repeated 5 times, the error ($\Delta K$) of the reciprocal number value which is obtained by the reciprocal number arithmetic operating circuit can be converged to 0.01 dB or less.

FIG. 4 shows the performances of the reciprocal number arithmetic operating circuit of the invention and the conventional circuit for the same input vector signal (X+jY). An axis of ordinate indicates the error ($\Delta K$) when the reciprocal number value is obtained and an axis of abscissa indicates the number of times of the loop process.

In FIG. 4, in characteristics 100 of the reciprocal number arithmetic operating circuit of the invention, by repeating the loop process five times, the error can be converged to 0.01 dB or less. On the other hand, in the conventional reciprocal number arithmetic operating circuit, the number of times of the loop processes is equal to 24 times and the error is equal to 0.01 dB or less. Therefore, the reciprocal number arithmetic operating circuit of the invention can obtain the reciprocal number value for the input vector signal by a small operation amount and in a short time.

Figure 5:
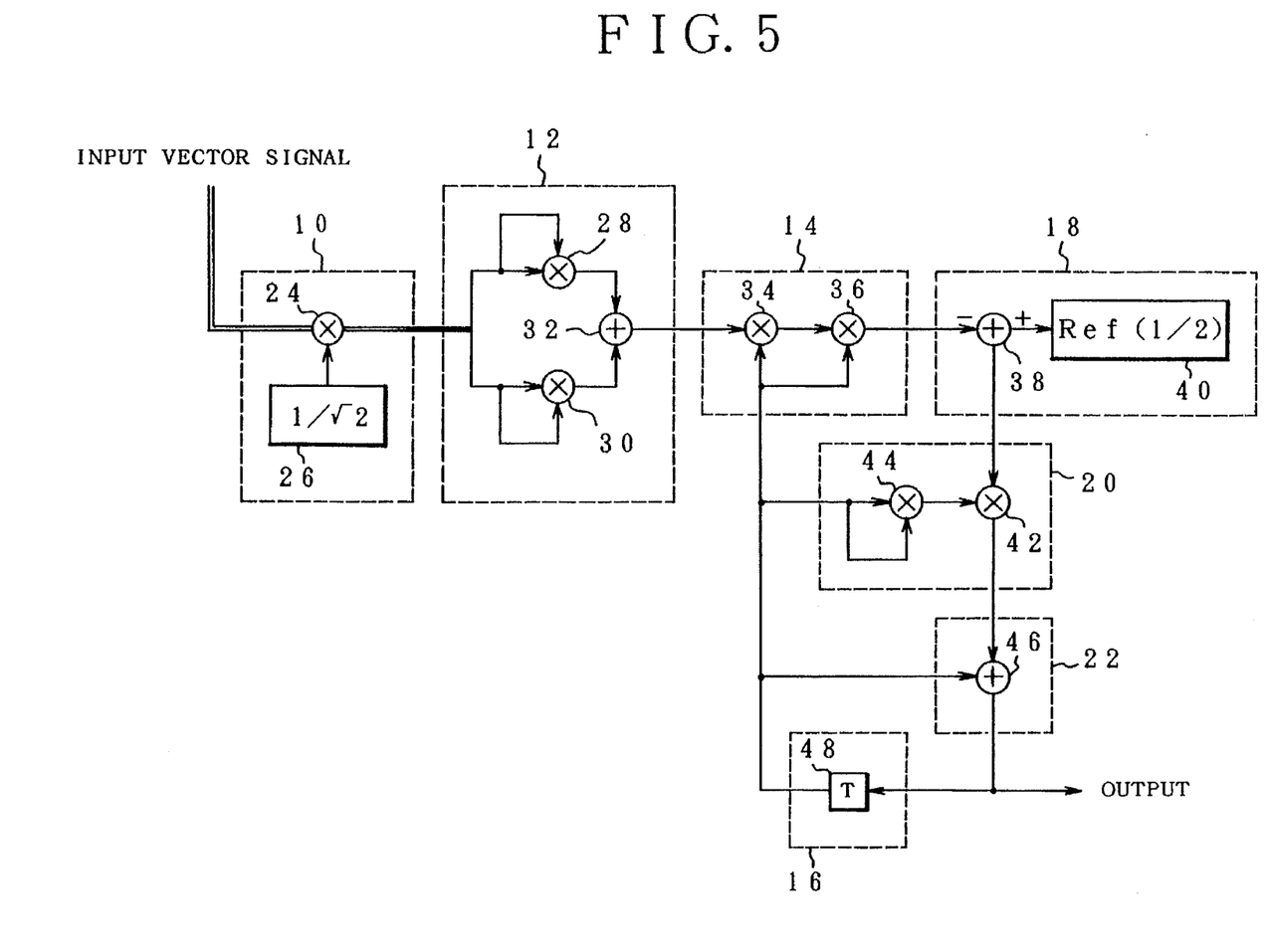
FIG. 5 is a circuit block diagram showing another embodiment of the invention.

FIG. 5 shows another embodiment of the invention. The embodiment is characterized in that in the loop gain adjusting circuit 20, the square ($K^2$) of the tap value (K) is multiplied to the error signal ($\Delta K$) from the differential circuit 18, thereby adjusting the loop gain. Namely, the loop gain adjusting circuit 20 has multipliers 42 and 44. The multiplier 44 squares the tap value (K) and the multiplier 42 multiplies the resultant value to the error signal ($\Delta K$). The other construction is substantially the same as the embodiment of FIG. 3. By raising an adjustment degree of the loop gain as mentioned above, the number of times of the loop arithmetic operations for converging the error signal ($\Delta K$) to 0 can be further reduced and the reciprocal number arithmetic operation of a higher speed as compared with that in the embodiment of FIG. 3 can be realized.

Figure 6:
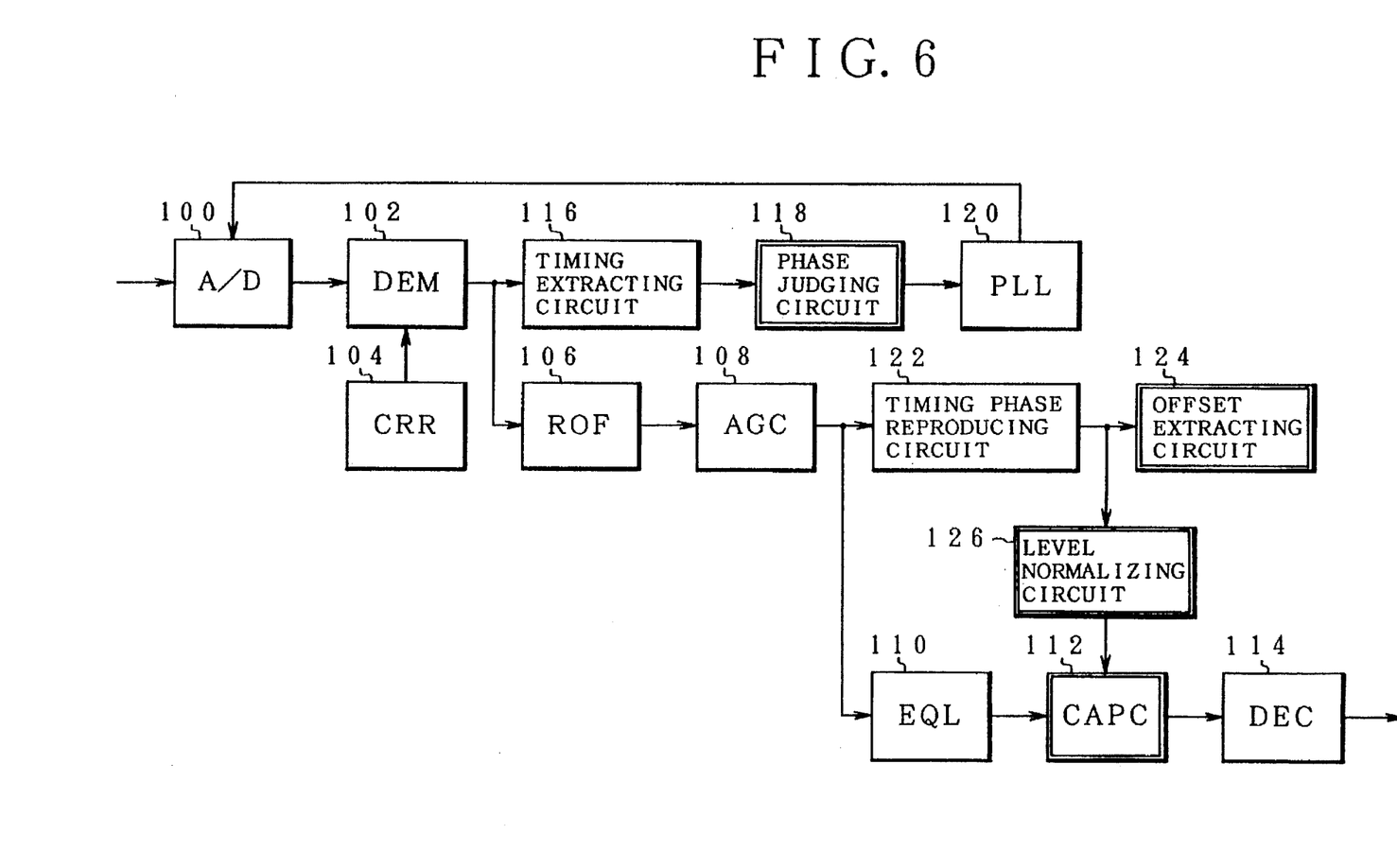
FIG. 6 is a block diagram showing a modem in which a reciprocal number arithmetic operating circuit of the invention is used.

FIG. 6 shows a modem in which the reciprocal number arithmetic operating circuit of the invention is used. A main signal demodulation system in the modem comprises an A/D converter 100, a demodulate circuit 102, a carrier generating circuit 104, a roll off filter 106, an AGC circuit 108, an automatic equalizer 110, a carrier automatic phase control circuit 112, and a decode circuit 114. In order to synchronize a sampling clock which is used in the A/D converter 100, a timing extracting circuit 116, a phase judging circuit 118, and a PLL circuit 120 are provided.

Further, in order to set an initial value of a frequency offset into the carrier automatic phase control circuit 112 at the time of pull-in by training, a timing phase reproducing circuit 122, an offset extracting circuit 124, and a level normalizing circuit 126 are provided.

In the modem as mentioned above, the reciprocal number arithmetic operating circuit of the invention is used by the carrier automatic phase control circuit 112, phase Judging circuit 118, offset extracting circuit 124, and level normalizing circuit 126 which are shown in a block of double frames. Namely, since the amplitude of the vector signal is unnecessary in the carrier automatic phase control circuit 112, phase Judging circuit 118, and offset extracting circuit 124, the reciprocal number arithmetic operating circuit of the invention is used to normalize the vector signal in a phase plane to a circle having a radius of 1.0.

In the level normalizing circuit 126, the reciprocal number arithmetic operating circuit of the invention is used for the purpose of the level normalization to instantaneously set a reception signal level to a certain predetermined value. The position at which the reciprocal number arithmetic operating circuit of the invention is used is not obviously limited to that shown in FIG. 4 but such a circuit can be used in a proper circuit which needs the reciprocal number value of the input vector signal.

As further modification of the invention, it is also possible to construct a simplified circuit by omitting the multiplying circuit 14 shown in the embodiments of FIG. 3 and 5. With respect to the embodiment of FIG. 3, a simplified circuit can be also constructed by omitting the loop gain adjusting circuit 20.

According to the invention as mentioned above, the reciprocal number value for the input vector signal can be obtained at a high precision, in a small arithmetic operation amount, and in a short time. Further, since the circuit itself can be simplified more than the conventional circuit, the miniaturization and the low costs of the apparatus can be also realized.

Although the above embodiment has been described with respect to a hardware of the vector arithmetic operating circuit which is realized by the digital signal processor as an example, such a construction can be also realized by a program control as a reciprocal number arithmetic operating method which realizes a step of the vector arithmetic operation by the digital signal processor.

Further, the invention is not limited by numerical values shown in the embodiments.

What is claimed is:

1. A reciprocal number arithmetic operating circuit for arithmetically calculating a reciprocal number value of an amplitude of an input vector signal (X+jY), comprising:

overflow preventing means for multiplying the input vector signal by a constant (A) to reduce a level of the input vector signal to prevent an overflow of the input vector signal by an arithmetic operation;

power arithmetic operating means for arithmetically calculating a first square of a real component and a second square of an imaginary component of an output signal of said overflow preventing means and adding the first square and the second square, thereby obtaining a power;

tap means for setting a tap value (K) as the reciprocal number value being obtained;

multiplying means for multiplying twice the tap value (K) of said tap means with an output signal of said power arithmetic operating means;

differential calculating means for subtracting a second output signal of said multiplying means from a predetermined reference (Ref), thereby obtaining an error signal ($\Delta K$);

loop gain adjusting means for multiplying the tap value (K) from said tap means with the error signal ($\Delta K$) from said differential calculating means to set a constant loop gain;

updating means for adding the error signal obtained through said loop gain adjusting means to the tap value from said tap means and for updating the error signal ($\Delta K$) from said differential calculating means to 0; and loop processing means for controlling the arithmetic operation by said multiplying means, said differential calculating means, said loop gain adjusting means, and said updating means to repeat a loop and, for controlling said updating means to output the tap value (K) obtained in said tap means as the reciprocal number value if the error signal ($\Delta K$) obtained in said differential calculating means is equal to or less than a predetermined value.

2. A circuit according to claim 1, wherein an initial value of the tap value (K) generated in said tap means is set to 0.7559.

3. A circuit according to claim 1, wherein a value of the constant (A) multiplied by said overflow preventing means is set to $1/\sqrt{2}$ and a value of the reference (Ref) in said differential calculating means is set to 1/2.

4. A reciprocal number arithmetic operating circuit for arithmetically calculating a reciprocal number value of an amplitude of an input vector signal (X+jY), comprising:

overflow preventing means for multiplying the input vector signal by a constant (A) to reduce a level of the input vector signal to prevent an overflow of the input vector signal during an arithmetic operation;

power arithmetic operating means for arithmetically calculating a first square of a real component and a second square of an imaginary component of an output signal of said overflow preventing means and for adding the first square and the second square, thereby obtaining a power;

tap means for setting a tap value (K) as the reciprocal number value being obtained;

multiplying means for multiplying twice the tap value (K) from said tap means with an output signal from said power arithmetic operating means;

differential calculating means for subtracting a second output signal of said multiplying means from a predetermined reference (Ref), thereby obtaining an error signal ($\Delta K$);

loop gain adjusting means for multiplying a second power ($K^2$) of the tap value (K) from said tap means with the error signal ($\Delta K$) from said differential Calculating means to set a constant loop gain;

updating means for adding the error signal obtained through said loop gain adjusting means to the tap value from said tap means and for updating the error signal ($\Delta K$) from said differential calculating means to 0; and loop processing means for controlling the arithmetic operation by said multiplying means, said differential calculating means, said loop gain adjusting means, and said updating means to repeat a loop, and for outputting the tap value (K) obtained by said tap means as the reciprocal number value if the error signal (ΔK) obtained by said differential calculating means is equal to or less than a predetermined value.

5. A circuit according to claim 4, wherein the initial value of the tap value (K) which is generated by said tap means is set to 0.7559.

6. A circuit according to claim 4, wherein a value of the constant (A) which is multiplied by said overflow preventing means is set to $1/\sqrt{2}$ and a value of the reference (Ref) of said differential calculating means is set to 1/2.

7. A reciprocal number arithmetic operating circuit for arithmetically calculating a reciprocal number value of an amplitude of an input vector signal (X+jY), comprising:

overflow preventing means for multiplying the input vector signal by a constant (A) to reduce a level of the input vector signal to prevent an overflow of the input vector signal during an arithmetic operation;

power arithmetic operating means for arithmetically calculating a first square of a real component and a second square of an imaginary component of an output signal of said overflow preventing means and adding the first square and the second square, thereby obtaining a power;

tap means for setting a tap value (K) as the reciprocal number value being obtained;

differential calculating means for subtracting a second output signal of said power arithmetic operating means from a predetermined reference (Ref), thereby obtaining an error signal (ΔK);

loop gain adjusting means for multiplying the tap value (K) from said tap means by the error signal (ΔK) of said differential calculating means to set a constant loop gain;

updating means for adding the error signal obtained through said loop gain adjusting means to the tap value from said tap means and for updating the error signal (ΔK) from said differential calculating means to 0; and loop processing means for controlling the arithmetic operation of said differential calculating means, said loop gain adjusting means, and said updating means by repeating a loop and, for outputting the tap value (K) obtained in said tap means as the reciprocal number value if the error signal (ΔK) obtained in said differential calculating means is equal to or less than a predetermined value.

8. A reciprocal number arithmetic operating circuit for arithmetically calculating a reciprocal number value of an amplitude of an input vector signal (X+jY), comprising:

overflow preventing means for multiplying a constant (A) to reduce a level of the input vector signal to prevent an overflow of the input vector signal by an arithmetic operation;

power arithmetic operating means for arithmetically calculating a first square 8 of a real component and a second square of an imaginary component of an output signal of said overflow preventing means and adding the first square and the second square, thereby obtaining a power;

tap means for setting a tap value (K) as the reciprocal number value being obtained;

multiplying means for multiplying twice the tap value (K) of said tap means by a second output signal of said power arithmetic operating means;

differential calculating means for subtracting a third output signal of said multiplying means from a predetermined reference (Ref), thereby obtaining an error signal (ΔK);

updating means for adding the error signal (ΔK) from said differential calculating means to the tap value from said tap means and for updating the error signal (ΔK) from said differential calculating means to 0; and loop processing means for controlling the arithmetic operation by repeating an operation of said multiplying means, said differential calculating means, and said updating means in a loop and, for outputting the tap value (K) obtained in said tap means as the reciprocal number value if the error signal (ΔK) obtained in said differential calculating means is equal to or less than a predetermined value.

9. A reciprocal number arithmetic operating circuit for arithmetically calculating a reciprocal number value of an amplitude of an input vector signal (X+jY), comprising:

overflow preventing means for multiplying the input vector signal by a constant (A) to reduce a level of the input vector signal to prevent an overflow of the input vector signal by an arithmetic operation;

power arithmetic operating means for arithmetically calculating a first square 8 of a real component and a second square of an imaginary component of an output signal of said overflow preventing means and for adding the first square and the second square, thereby obtaining a power;

tap means for setting a tap value (K) as the reciprocal number value being obtained;

differential calculating means for subtracting a second output signal of said power arithmetic operating means from a predetermined reference (RED, thereby obtaining an error signal (ΔK);

loop gain adjusting means for multiplying a second power ($K^2$) of the tap value (K) from said tap means by the error signal (ΔK) of said differential calculating means to set a loop gain to be constant;

updating means for adding the error signal obtained through said loop gain adjusting means to the tap value from said tap means and for updating the error signal (ΔK) from said differential calculating means to 0; and loop processing means for controlling the arithmetic operation by said differential calculating means, loop gain adjusting means, and updating means by repeating a loop and for outputting the tap value (K) obtained by said tap means as a reciprocal number value if the error signal (ΔK) obtained by said differential calculating means is equal to or less than a predetermined value.

* * * * *

UNITED STATES PATENT AND TRADEMARK OFFICE
CERTIFICATE OF CORRECTION

PATENT NO. : 5,650,953
DATED : July 22, 1997
INVENTOR(S) : Takashi KAKU, et al.

It is certified that error appears in the above-indentified patent and that said Letters Patent is hereby corrected as shown below:

Col. 9, line 57, delete "8".

Col. 10, line 32, delete "8".

Signed and Sealed this

Twenty-fifth Day of November, 1997

Attest:

BRUCE LEHMAN

Attesting Officer

Commissioner of Patents and Trademarks